(12) United States Patent
Panchamia et al.

(10) Patent No.: US 12,047,351 B2
(45) Date of Patent: Jul. 23, 2024

(54) NETWORK SYSTEM ARCHITECTURE USING A VIRTUAL PRIVATE NETWORK (VPN) AS A SIDECAR FOR CONTAINERIZED DEVICES SUPPORTING CONTAINERS

(71) Applicants: Sanket Panchamia, Bangalore Karnataka (IN); Amith K K, Bangalore Karnataka (IN); H P Pranaav, Bangalore Karnataka (IN); Kanupriya Pandey, Bangalore Karnataka (IN)

(72) Inventors: Sanket Panchamia, Bangalore Karnataka (IN); Amith K K, Bangalore Karnataka (IN); H P Pranaav, Bangalore Karnataka (IN); Kanupriya Pandey, Bangalore Karnataka (IN)

(73) Assignee: Unisys Corporation, Blue Bell, PA (US)

( * ) Notice: Subject to any disclaimer, the term of this patent is extended or adjusted under 35 U.S.C. 154(b) by 556 days.

(21) Appl. No.: 17/209,328

(22) Filed: Mar. 23, 2021

(65) Prior Publication Data

US 2022/0247725 A1 Aug. 4, 2022

(30) Foreign Application Priority Data

Feb. 3, 2021 (IN) .............................. 202111004650

(51) Int. Cl.
*H04L 9/40* (2022.01)
*H04L 67/1095* (2022.01)

(52) U.S. Cl.
CPC ........ *H04L 63/0272* (2013.01); *H04L 63/164* (2013.01); *H04L 67/1095* (2013.01)

(58) Field of Classification Search
CPC ......................... H04L 63/0272; H04L 63/164; H04L 67/1095
See application file for complete search history.

(56) References Cited

U.S. PATENT DOCUMENTS 10,764,244 B1 * 9/2020 Mestery ............... H04L 61/2592
11,196,665 B1 * 12/2021 Pereira ................... H04L 67/63

* cited by examiner

*Primary Examiner* — Hee K Song
(74) *Attorney, Agent, or Firm* — Shook, Hardy & Bacon L.L.P.

(57) ABSTRACT

A host computing device for use in a network architecture having at least one client computing device or network, at least one server computing device or network and a gateway coupled between the at least one client computing device or network and the at least one server computing device or network. The host computing device includes at least one application container and at least one sidecar container coupled to the application container. The sidecar container provides supporting features to the application container. The sidecar container is a virtual private network (VPN) sidecar that performs at least one sidecar function on behalf of the application container.

20 Claims, 4 Drawing Sheets

NETWORK SYSTEM ARCHITECTURE USING A VIRTUAL PRIVATE NETWORK (VPN) AS A SIDECAR FOR CONTAINERIZED DEVICES SUPPORTING CONTAINERS

BACKGROUND

Field

The instant disclosure relates to network system architecture, and in particular to systems using sidecars for containerized applications.

Description of the Related Art

Network architecture refers to how computing devices or computing device networks are organized in a system, and how tasks are allocated between the computing devices or computing device networks. Two of the most widely used types of network architectures are peer-to-peer (P2P) and client/server.

In a peer-to-peer network architecture, a plurality of computing devices or networks are coupled together with equal permissions and responsibilities for processing data. In a peer-to-peer network architecture, no computing devices or networks are designed solely to serve or to receive data.

In a client/server network architecture, a plurality of client computing devices or networks are coupled to a centralized server or computing network, and each client computing device or network requests and receives service form the centralized server or computing network. In a client/server network architecture, each client computing device or network provides an interface, such as a physical or virtual gateway, to the centralized server or computing network to request services of the centralized server or computing network and to receive results from the centralized server or computing network.

Network architectures can be physical or virtual. In a physical network architecture, computing devices or networks are connected to one another through cabling and/or other physical hardware. In a virtual network architecture, computing devices or networks are connected to one another, e.g., over the Internet and wirelessly, using software management and/or other non-physical means.

Within each computing device or network, one or more hosts can run one or more applications or services thereon. Applications or services, including software components, can run on a number of different computing platforms within the respective host. For example, an application can run in a container on a physical or virtual machine. In the case of an application running in a container on a virtual machine, the virtual machine provides hardware virtualization, and the container provides operating system virtualization.

Containerization refers to a form of operating system virtualization, through which applications are run in isolated spaces called containers, all using the same shared operating system. In this manner, multiple applications and services can be deployed and run on a single host without having to launch an entire virtual machine for each application or service.

A container can be a component, including a software component, that hosts other components, including other software components. A container typically is implemented as an isolated user space instance, which may look and feel like a real server or other computing device. A container sometimes is referred to as a virtualization engine (VE) or a virtual private server (VPS). A container provides execution support to the components that the container hosts in a manner that is similar to an operating system hosting processes. In general, containers allow applications to run more reliably when the applications are moved from one computing environment to another. Also, a container can serve as a protective barrier, e.g., by monitoring the interactions between hosted components and components outside of the container, and restricting the interactions to those components that are deemed safe.

A sidecar is a container that attaches to a main (or primary) application or service container. The sidecar typically shares the same volume and network as the primary application or service container, and the sidecar typically assists or enhances how the primary application or service operates. A sidecar can be attached to a single containerized application or service, or attached to multiple containerized applications or services simultaneously.

A sidecar design pattern deploys peripheral components, tasks and/or features of a primary application or service into a separate process or container to provide isolation and encapsulation. While the primary application or service contains the core logic and functionality, the attached sidecar provides supporting features for the primary application or service. For example, a sidecar can provide monitoring, logging, configuration and networking services for the primary application or service. The sidecar also can provide platform abstraction and various virtual agent services for the primary application or service.

The use of a sidecar has many advantages. For example, the use of a sidecar keeps primary application or service logic intact and maintainable. The use of a sidecar also reduces code duplication and provides reusability of primary application or service containers. The sidecar also is independent from the primary application or service in terms of runtime environment.

The use of a sidecar also provides low communication latency because of the proximity of the sidecar to its respective primary application(s) or service(s). The use of a sidecar also shares the overall lifecycle of its respective primary application(s) or service(s), but the sidecar can be independently updated.

Despite the many advantages of a sidecar, some services running as a sidecar may not be feasible for some primary application(s) or service(s). For example, running some tasks or features as a sidecar to primary application(s) or service(s) requires a relative large amount of memory. Accordingly, for resource constrained primary application(s) or service(s), such as Internet of Things (IoT) devices and other network edge devices, the relative large memory footprint requirement of some tasks or features running as a sidecar can be problematic in terms of maintaining all of the functionalities of the sidecar tasks or features.

SUMMARY

Disclosed is a host computing device for use in a network architecture having at least one client computing device or network, at least one server computing device or network and a gateway coupled between the at least one client computing device or network and the at least one server computing device or network. The host computing device includes at least one application container and at least one sidecar container coupled to the application container. The sidecar container provides supporting features to the application container. The sidecar container is a virtual private network (VPN) sidecar that performs at least one sidecar function on behalf of the application container.

DETAILED DESCRIPTION

Figure 1:
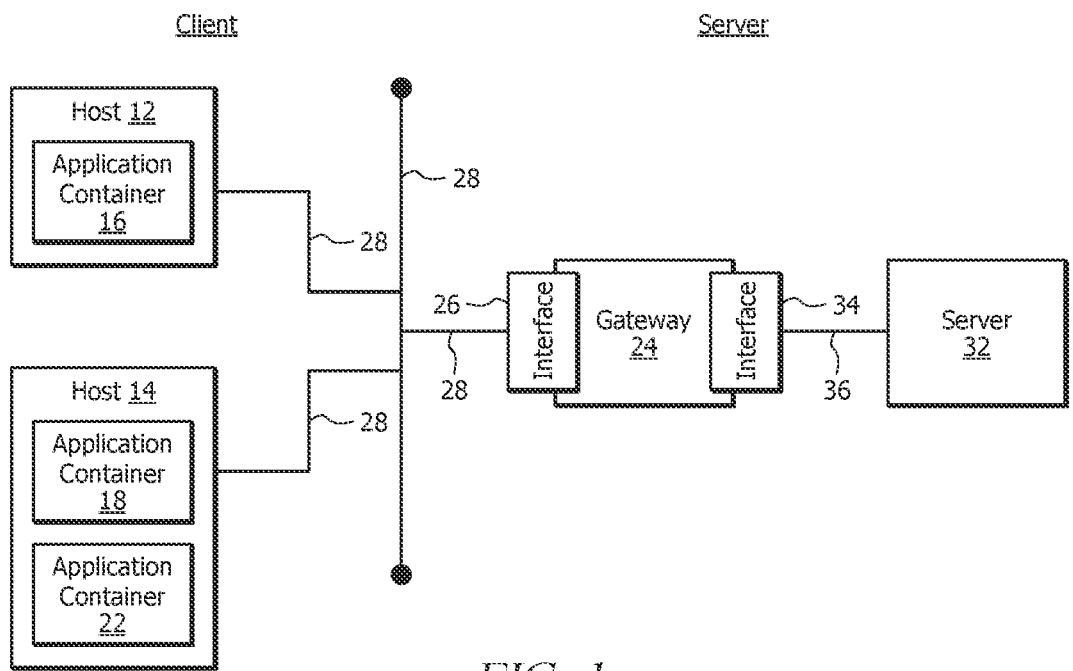
FIG. 1 is a schematic view of a conventional client/server network architecture.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

FIG. 1 is a schematic view of a conventional client/server network architecture 10. As noted hereinabove, a network architecture can be physical or virtual. In a physical network architecture, computing devices or networks are connected to one another through cabling and/or other physical hardware. In a virtual network architecture, computing devices or networks are connected to one another, e.g., over the Internet and/or wirelessly, using software management and/or other non-physical means.

The client/server network architecture 10 includes a plurality of (client) hosts 12, 14 on the client side of the network architecture 10. Each host can be one or more computing devices, a network of computing devices or other suitable computing platform(s). Each host can include one or more applications or services running thereon, and one or more of the applications or services can run in a container within the host (client) computing device. For example, the host 12 can include an application container 16 running thereon, and the host 14 can include an application container 18 and an application container 22 running thereon.

Applications, including software components, can run on a number of different computing platforms. For example, an application can run in a container on a physical or virtual machine within a host. In the case of an application running in a container on a virtual machine, the virtual machine provides hardware virtualization, and the container provides operating system virtualization.

As discussed hereinabove, a container is a component, including a software component, that hosts other components, including other software components. A container typically is implemented as an isolated user space instance, which may look and feel like a real computing device. A container typically provides execution support to the components that the container hosts in a manner that is similar to an operating system hosting processes. In general, containers allow applications to run more reliably when the applications are moved from one computing environment to another. Also, a container can serve as a protective barrier, e.g., by monitoring the interactions between hosted components and software components outside of the container, and restricting the interactions to those that are deemed safe.

Each host 12, 14 is coupled to a gateway 24 via a client (or client side) interface 26 and any suitable coupling mechanism 28. For a physical network architecture, the gateway 24 can be any suitable network gateway, such as the Internet or other suitable physical gateway component or components. For a virtual network architecture, the gateway 24 can be one or more virtual machines (VMs) or other suitable type of virtual gateway.

The gateway 24 also is coupled to a server 32 (or plurality of servers) on the server side of the network architecture 10. The server 32 is coupled to the gateway 24 via a server (or server side) interface 34 and any suitable coupling mechanism 36.

In operation, the client/server network architecture 10 passes data through the gateway between the hosts 12, 14 and the server 32. Typically, each host 12, 14 requests various services or data from the server 32 via the gateway 24, and the server 32 provides the requested results to each host 12, 14 via the gateway 24.

Figure 2:
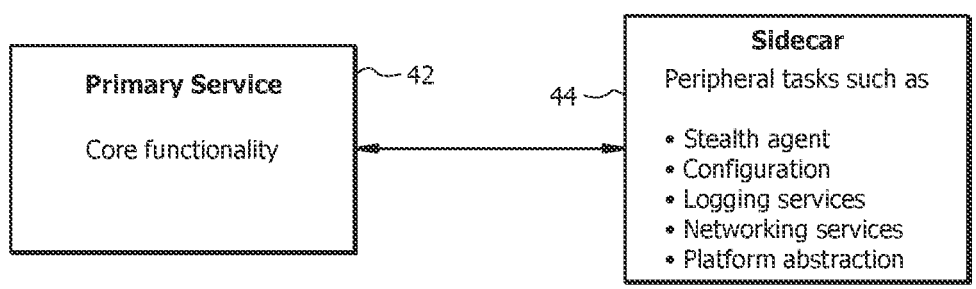
FIG. 2 is a schematic view of a conventional sidecar design pattern.

FIG. 2 is a schematic view of a conventional sidecar design pattern 40. The sidecar design pattern 40 includes a main or primary application or service container 42 and a sidecar 44 that attaches to the application or service container 42. As discussed hereinabove, the sidecar 44 shares the same volume and network as the primary application or service container 42, and the sidecar 44 typically assists or enhances how the primary application or service 42 operates.

Figure 3A:
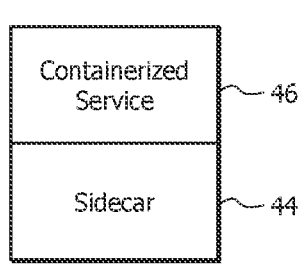
FIG. 3A is a schematic view of a conventional sidecar attached to a single containerized service.
Figure 3B:
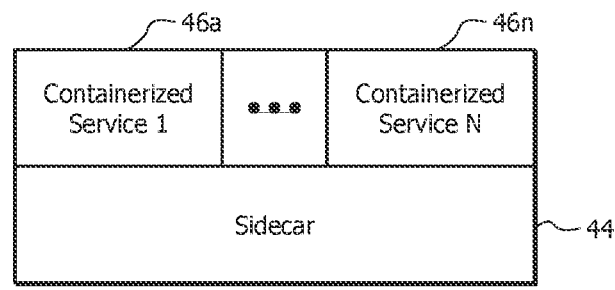
FIG. 3B is a schematic view of a conventional sidecar attached to multiple containerized services.

The sidecar 44 can be attached to a single containerized application or service 46, e.g., as shown in FIG. 3A. Alternatively, the sidecar 44 can be attached to multiple containerized applications or services $46_1$-$46_n$ simultaneously, e.g., as shown in FIG. 3B.

As discussed hereinabove, a conventional sidecar design pattern deploys peripheral components, tasks and/or features of a primary application or service into a separate process or container to provide isolation and encapsulation. While the primary application or service contains the core logic and functionality, the attached sidecar provides supporting features for the primary application or service.

For example, a sidecar can provide monitoring, logging, configuration and networking services for the primary application or service. The sidecar also can provide platform abstraction and virtual agent services for the primary application or service.

The use of a sidecar has many advantages. For example, the use of a sidecar keeps primary application or service logic intact and maintainable. The use of a sidecar also reduces code duplication and provides reusability of primary application or service containers. The sidecar also is independent from the primary application or service in terms of runtime environment. The use of a sidecar also provides low communication latency because of the proximity of the sidecar to its respective primary application(s) or service(s). The use of a sidecar also shares the overall lifecycle of its respective primary application(s) or service(s), although the sidecar can be independently updated.

Despite the many advantages of a conventional sidecar, some services or features running as a sidecar may not be feasible for some primary application(s) or service(s). For example, running some tasks or features (e.g., some virtual agents) as a sidecar to primary application(s) or service(s) often requires a relative large amount of memory. Accordingly, for resource constrained primary application(s) or service(s), such as Internet of Things (IoT) devices and other network edge devices, the relative large memory footprint requirement of some services or features running as a sidecar can be problematic in terms of maintaining the functionality of all the sidecar service(s) or feature(s).

Figure 4:
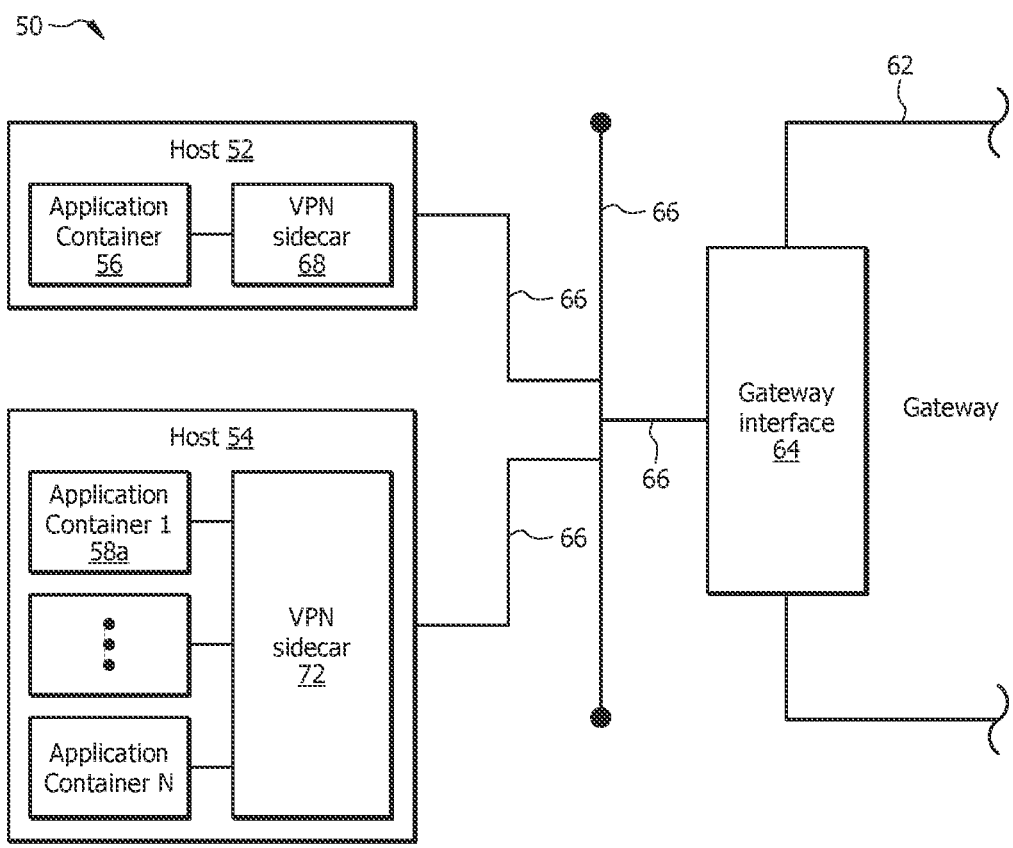
FIG. 4 is a schematic view of the client side portion of a client/server network architecture, according to an embodiment.

FIG. 4 is a schematic view of the client side portion 50 of a client/server network architecture, according to an embodiment. The client side portion 50 includes a plurality of (client) hosts 52, 54. Each host can be or include one or more computing devices, a network of computing devices, one or more Internet of Things (IoT) devices or other network edge devices, or other suitable computing platform(s).

Each host 52, 54 can include one or more applications or services running thereon, and one or more of the applications or services can run in a container. For example, the host 52 can include an application container 56 running thereon, and the host 54 can include a plurality of application containers $58_1$-$58_N$ running thereon.

Each host 52, 54 is coupled to a gateway 62 via a client (or client side) interface 64 and any suitable coupling mechanism 66. For example, for a virtual network architecture, the gateway 62 can be one or more virtual machines (VMs) or other suitable type of virtual gateway.

According to an embodiment, the client side portion 50 includes a virtual private network (VPN) as a sidecar to a single application container or to a plurality of application containers. For example, as shown, the host 52 has a VPN 68 as a sidecar to the application container 56, and the host 54 has a VPN 72 as a sidecar to the application containers $58_1$-$58_N$. According to an embodiment, the VPN 72 provides an encrypted connection between the respective application container or containers and the gateway 62.

In general, a virtual private network (VPN) is a secure or encrypted connection from a device or network to another network, typically via the Internet or other suitable gateway. Via a VPN, data traffic is routed through an encrypted virtual tunnel, which disguises the source of the data, making the data source invisible. A VPN connection also is secure against external attacks.

Conventionally, a VPN allows a device or network to connect to another network through the encrypted VPN connection rather than through the existing physical or virtual connection between the device or network and other network(s). Typically, VPNs are used to access a home or work network remotely, or to hide data traffic activity of a device on a local network.

According to an embodiment, a VPN is created and established as a sidecar to one or more application containers to perform one or more sidecar functions and network related activities on behalf of the attached application container. For example, according to an embodiment, one or more of the VPNs 68, 72 can be a strongSwan VPN or other suitable VPN (such as an openSwan VPN or a libreSwan VPN) or any other IPSec (IP security) compliant VPN client capable of suitably connecting to the gateway 62.

According to an embodiment, the use of a VPN as a sidecar to one or more application containers has several advantages over conventional sidecars attached to application containers. For example, a VPN sidecar typically has a reduced memory footprint compared to conventional sidecars offering the same of similar features. Also, a VPN sidecar often provides an ease of configuration typically not found with conventional sidecars. For example, with a VPN sidecar, the client host needs to be concerned only with the configuration of the VPN.

Also, a VPN sidecar often provides an ease of maintenance typically not found with conventional sidecars. For example, with a VPN sidecar, the maintenance of the container to which the VPN sidecar is attached is managed by the client host, and the configuration and management of the features provided by the VPN sidecar is handled by the gateway or the gateway administrator.

Also, a VPN sidecar provides secure, role based access control, as only authorized users of the gateway can access and modify the configuration of the features provided by the VPN sidecar. Also, because a VPN sidecar is platform agnostic, and does not depend on any underlying hardware architecture, the features provided by the VPN sidecar, as well as the respective container(s), can run on any suitable underlying platform architecture.

Figure 5:
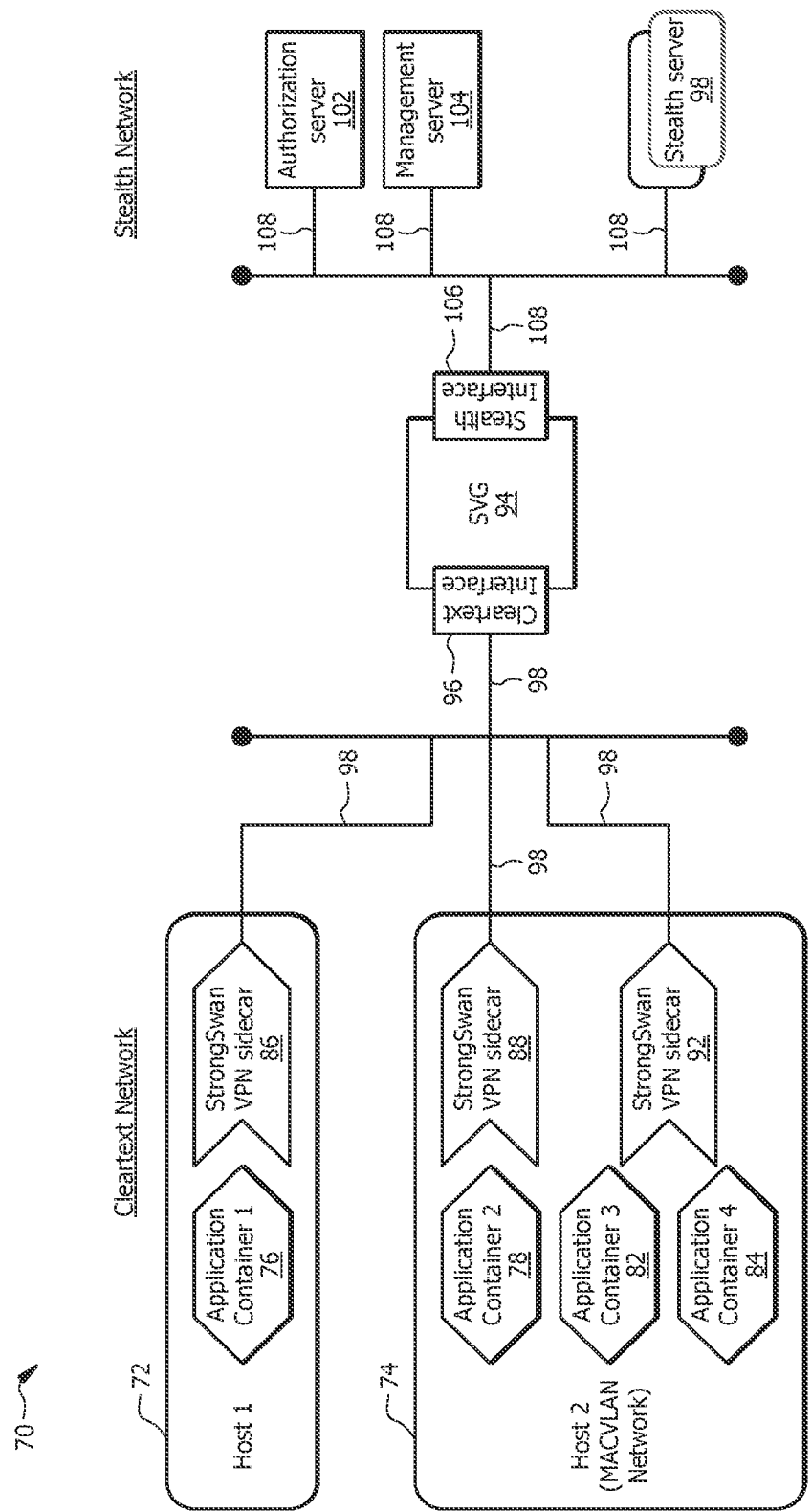
FIG. 5 is a schematic view of a client/server network architecture, in which the client side includes a cleartext network and the server side includes Unisys Stealth capabilities, according to an embodiment.

FIG. 5 is a schematic view of a client/server network architecture 70, in which the client side includes a cleartext network and the server side includes Unisys Stealth capabilities, according to an embodiment. The client side portion of the network architecture 70 includes a plurality of (client) hosts 72, 74. Each host can be or include one or more computing devices, a network of computing devices, one or more Internet of Things (IoT) devices or other network edge devices, or other suitable computing platform(s). Also, one or more of the hosts 72, 74 can be a macvlan network, which allows a single physical interface to have multiple mac (media access control) and IP (Internet protocol) addresses using macvlan sub-interfaces.

Each host 72, 74 can include one or more applications or services running thereon, and one or more of the applications (or services) can run in a container. For example, the host 72 can include an application container 76 running thereon. Also, the host 74 can include a plurality of application containers 78, 82, 84 running thereon.

According to an embodiment, a VPN sidecar is attached to a single application container or to a plurality of application containers. For example, as shown, a VPN sidecar 86, such as a strongSwan VPN sidecar, is attached to the application container 76 in the host 72. Also, in the host 74, a VPN sidecar 88, such as a strongSwan VPN sidecar, is attached to the application container 78. Also, in the host 74, a VPN sidecar 92, such as a strongSwan VPN sidecar, is attached to the application container 82 and to the application container 84.

According to an embodiment, the client side portion of the network architecture 70 can be a cleartext network or other suitable type of network, such as any network capable of allowing IPSec compliant communication to occur. In a cleartext network, transmitted or stored data has not been subjected to encryption and is not meant to be encrypted. The data in a cleartext network is in a form that is understandable to human beings without additional processing.

One or more of the application containers 76, 78, 82, 84 can be cleartext containers. According to an embodiment, the implementation of a VPN sidecar to a cleartext container allows that cleartext container to attach its network layer to the respective VPN sidecar attached to the cleartext container.

Each host 72, 74 is coupled to a gateway 94, such as a Unisys Stealth Secure Virtual Gateway (SVG) or other suitable gateway. Each host 72, 74 is coupled to the gateway 94 via a client (or client side) interface 96, such as a cleartext interface, and any suitable coupling mechanism 98.

Unisys Stealth is a system of tools designed to secure network infrastructure by cloaking data communication and end points on the network, making them obscure to outsiders, e.g., hackers. Unisys Stealth can segment a network virtually, so if an outsider could break through the perimeter of the network, the outsider would be contained in a controlled area, thus limiting access and risk.

One of the tools within the Unisys Stealth system of tools is the Unisys Stealth Secure Virtual Gateway (SVG). The SVG enables cleartext network endpoints of macvlan networks (such as host 72 and host 74) to participate in communities of interest with Unisys Stealth network endpoints. The SVG uses another Unisys Stealth tool, Virtual Stealth Endpoints (VSEs), as intermediate network devices within the SVG to translate and route traffic between a cleartext network and a Unisys Stealth-enabled network, thus enabling secure communications through the networks.

The gateway 94 also is coupled to a server (or plurality of servers) on the server side of the network architecture 70. According to an embodiment, the server side of the network architecture 70 is a Unisys Stealth network, and can include one or more Unisys Stealth servers 98, an authorization server 102 and a management server 104. The servers 98, 102, 104 are coupled to the gateway 94 via a server (or server side) interface 106, such as a Unisys Stealth interface, and any suitable coupling mechanism 108.

In operation, a VPN sidecar is attached to the application containers in the hosts. For example, in the host 72, a VPN sidecar 86, such as a strongSwan VPN sidecar, is attached to the application container 76 in the host 72. Also, in the host 74, a VPN sidecar 88, such as a strongSwan VPN sidecar, is attached to the application container 78. Also, in the host 74, a VPN sidecar 92, such as a strongSwan VPN sidecar, is attached to the application container 82 and to the application container 84.

The implementation of VPN sidecars to the application containers allows each cleartext container to attach its network layer to the respective VPN sidecar of the cleartext container. The respective VPN sidecar can then be assigned a Virtual Stealth Endpoint (VSE) on the SVG 94. As noted hereinabove, VSEs act as intermediate network devices to translate and route data traffic between the cleartext network and the Unisys Stealth-enabled network to enable secure communications through the networks. In this manner, each VPN sidecar is treated as a single user by the SVG 94, and each VPN sidecar is uniquely identified, e.g., through the use of X.509 certificates (X.509 is a standard that defines the format of public key certificates).

According to an embodiment of the invention, assigning each VPN sidecar a VSE on the SVG 94 can be performed by a Stealth Virtual Agent (SVA), which is a feature of the SVG 94. The SVA enables clients on the host side of the network to connect to the VSEs within the SVG 94 via an IPSec tunnel, using X.509 certificates as a means of authentication.

The SVA also assigns other roles to each of the VPN sidecars, such as various Unisys Stealth roles that are assigned to the VSE. The SVA assigns roles to the VPN sidecars based on the rules configured in the SVG 94. The rules configured in the SVG 94 work on the X.509 certificates presented by the VPN sidecars.

Once the SVA assigns a VSE to the VPN sidecars and the appropriate roles of the VPN sidecars are assigned, the functionality of assigning Unisys Stealth roles to the SVG 94 and assigning secure networking roles to the VPN sidecars can be divided.

Also, according to an embodiment, the SVG 94 provides dynamic isolation of the application containers connected to the VSEs within the SVG 94.

Also, as noted hereinabove, the VPN is platform agnostic, therefore the application container to which the VPN is attached can run on any suitable underlying hardware architecture within the respective host.

According to an embodiment, any target device, i.e., any host on the client side network, is now able to be integrated into the Unisys Stealth ecosystem provided by the Unisys Stealth network.

It should be noted that, in conventional sidecar arrangements, sidecar configuration and management is relatively difficult compared to the sidecar arrangements described herein. For example, in conventional sidecar arrangements, sidecar configuration (e.g., setting up appropriate roles for the sidecars) can only be done from the client side. As discussed hereinabove, according to an embodiment, assigning roles for the VPN sidecars is performed by the SVA. Also, as discussed hereinabove, the use of a VPN sidecar often reduces the size of the memory footprint of the sidecar compared to conventional sidecars having similar roles and features.

Figure 6:
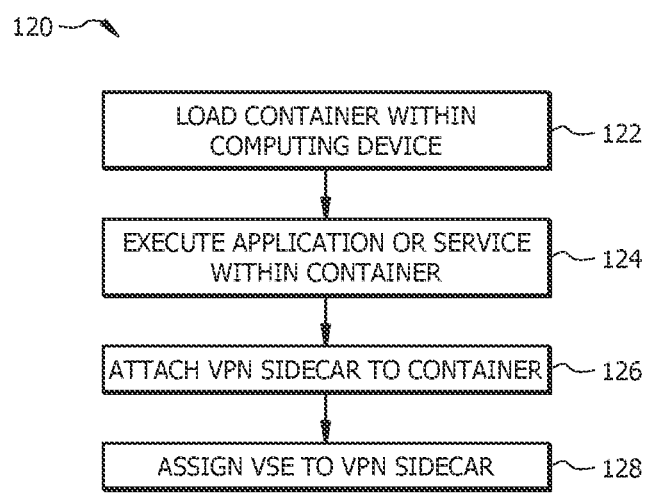
FIG. 6 is a flow diagram of a method for configuring a client/server network architecture, according to an embodiment.

FIG. 6 is a flow diagram of a method 120 for configuring a client/server network architecture, according to an embodiment. The method 120 includes a step 122 of loading one or more application or service containers within a client computing device. The method also includes a step 124 of executing the loaded application(s) or service(s) within the loaded container. As discussed hereinabove, each host (client) computing device can have one or more applications or services running thereon, and one or more of the applications or services can run in a container within the host (client) computing device.

The method 120 also includes a step 126 of attaching a sidecar to the application or service container within the host (client) computing device. As discussed hereinabove, according to an embodiment, the sidecar is a virtual private network (VPN) sidecar that performs one or more sidecar functions on behalf of the attached application or service container.

The method 120 also includes a step 128 of assigning the VPN sidecar a Virtual Stealth Endpoint (VSE). As discussed hereinabove, the VSE translates and routes data traffic as secure communications between the host (client) computing device and the server computing device via the network gateway. According to an embodiment, the VPN sidecar can be assigned by a Stealth Virtual Agent (SVA).

It will be apparent to those skilled in the art that many changes and substitutions can be made to the embodiments described herein without departing from the spirit and scope of the disclosure as defined by the appended claims and their full scope of equivalents.

The invention claimed is:

1. A host computing device for use in a network architecture having at least one client computing device or network, at least one server computing device or network and a gateway coupled between the at least one client computing device or network and the at least one server computing device or network, comprising:

at least one application container; and at least one sidecar container coupled to the at least one application container, wherein the at least one sidecar container provides supporting features to the at least one application container, wherein the at least one sidecar container is a virtual private network (VPN) sidecar that performs at least one sidecar function on behalf of the at least one application container, wherein the VPN sidecar is assigned a Virtual Stealth Endpoint (VSE), and wherein the VSE translates and routes data traffic as secure communications between the at least one client computing device and the at least one server computing device via the network gateway.

2. The host computing device as recited in claim 1, wherein the VPN sidecar allows the maintenance of the at least one application container to be managed by the host computing device, and wherein the VPN sidecar allows the configuration and management of the VPN sidecar to be managed by the gateway.

3. The host computing device as recited in claim 1, wherein the VPN sidecar is configured in such a way that the features provided by the VPN sidecar can be accessed and modified only by authorized users of the gateway.

4. The host computing device as recited in claim 1, wherein the at least one application container has a network layer, wherein the VPN sidecar has a network layer, and wherein the VPN sidecar allows the network layer of the application container to attach to the network layer of the VPN sidecar.

5. The host computing device as recited in claim 1, wherein the VPN sidecar is platform agnostic.

6. The host computing device as recited in claim 1, wherein the VPN sidecar is an IPSec compliant VPN sidecar.

7. The host computing device as recited in claim 1, wherein the supporting features provided by the sidecar container include at least one of monitoring services, logging services, configuration services, networking services, platform abstraction and virtual agent services.

8. A network architecture, comprising:
    at least one client computing device,
    wherein the at least one client computing device includes:
    at least one application container, and
    at least one sidecar container coupled to the at least one application container, wherein the at least one sidecar container provides supporting features to the at least one application container,
    wherein the at least one sidecar container is a virtual private network (VPN) sidecar that performs at least one sidecar function on behalf of the at least one application container;
    at least one server computing device; and
    a network gateway coupled between the at least one client computing device and the at least one server computing device, wherein the VPN sidecar is assigned a Virtual Stealth Endpoint (VSE), and wherein the VSE translates and routes data traffic as secure communications between the at least one client computing device and the at least one server computing device via the network gateway.

9. The network architecture as recited in claim 8, wherein the VPN sidecar allows the maintenance of the at least one application container to be managed by the host computing device, and wherein the VPN sidecar allows the configuration and management of the VPN sidecar to be managed by the gateway.

10. The network architecture as recited in claim 8, wherein the VPN sidecar is configured in such a way that the features provided by the VPN sidecar can be accessed and modified only by authorized users of the gateway.

11. The network architecture as recited in claim 8, wherein the at least one application container is a cleartext container having a network layer, and wherein the VPN sidecar allows the cleartext container to attach its network layer to the VPN sidecar.

12. The network architecture as recited in claim 8, wherein the at least one client computing device is an Internet of Things (IOT) edge device.

13. The network architecture as recited in claim 8, wherein the VPN sidecar is an IPSec compliant VPN sidecar.

14. The network architecture as recited in claim 8, wherein the at least one host computing device hosts a macvlan network.

15. The network architecture as recited in claim 8, wherein the gateway is a Unisys Stealth Secure Virtual Gateway (SVG).

16. The network architecture as recited in claim 8, wherein the gateway is coupled to the at least one host computing device via a cleartext interface and wherein the gateway is coupled to the at least one server computing device via a Unisys Stealth interface.

17. The network architecture as recited in claim 8, wherein the at least one server computing device is a Unisys Stealth network.

18. The network architecture as recited in claim 8, wherein the at least one server computing device includes a Unisys Stealth server.

19. A method for configuring a network architecture, the network architecture having at least one client computing device, at least one server computing device and at least one network gateway coupled between the at least one client computing device and the at least one server computing device;
    loading at least one application or service container within the at least one client computing device;
    executing at least one application or service within the at least one application or service container;
    attaching at least one sidecar container to the at least one application or service container, wherein the at least one sidecar container is a virtual private network (VPN) sidecar that performs at least one sidecar function on behalf of the at least one application or service container; and
    assigning the VPN sidecar a Virtual Stealth Endpoint (VSE), wherein the VSE translates and routes data traffic as secure communications between the at least one client computing device and the at least one server computing device via the network gateway.

20. The method as recited in claim 19, wherein assigning the VPN sidecar a Virtual Stealth Endpoint (VSE) comprises a Stealth Virtual Agent (SVA) assigning the VPN sidecar a Virtual Stealth Endpoint (VSE).

* * * * *